(12) United States Patent
Huang et al.

(10) Patent No.: US 12,192,180 B1
(45) Date of Patent: *Jan. 7, 2025

(54) PRIVACY PRESERVING USER GROUP EXPANSION

(71) Applicant: Google LLC, Mountain View, CA (US)

(72) Inventors: Wei Huang, Kirkland, WA (US); Fabio Soldo, Los Altos, CA (US); Surbhi Maheshwari, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,185

(22) Filed: Nov. 30, 2023

Related U.S. Application Data

(63) Continuation of application No. 17/397,089, filed on Aug. 9, 2021, now Pat. No. 11,888,825.

(51) Int. Cl.
 *H04L 9/40* (2022.01)
 *G06N 3/08* (2023.01)
(52) U.S. Cl.
 CPC ........... *H04L 63/0421* (2013.01); *G06N 3/08* (2013.01)
(58) Field of Classification Search
 CPC .............................. H04L 63/0421; G06N 3/08
 USPC ........................................................ 726/26
 See application file for complete search history.

(56) References Cited

U.S. PATENT DOCUMENTS

| | | | | |
|---|---|---|---|---|
| 10,839,349 | B1* | 11/2020 | Goyette | G06F 18/24133 |
| 2011/0307551 | A1* | 12/2011 | Danezis | H04W 4/21 |
| | | | | 380/46 |
| 2014/0108961 | A1* | 4/2014 | Sundsten | G06Q 50/01 |
| | | | | 715/753 |
| 2020/0342961 | A1* | 10/2020 | Baughman | G06F 16/285 |
| 2023/0163978 | A1* | 5/2023 | Turner | H04L 9/3268 |
| | | | | 713/168 |
| 2023/0205915 | A1* | 6/2023 | Wang | G06N 20/00 |
| | | | | 726/26 |

OTHER PUBLICATIONS

GitHub.com [online], "Evaluation of Cohort Algorithms for the FLoC API," Oct. 2020, retrieved on Aug. 6, 2021, retrieved from URL<https://github.com/google/ads-privacy/tree/master/proposals/FLoC>, 2 pages.
GitHub.com [online], "Federated Learning of Cohorts (FLoC)," Jan. 2021, retrieved on Aug. 6, 2021, retrieved from URL<https://github.com/WICG/floc>, 6 pages.

(Continued)

*Primary Examiner* — Michael S McNally
(74) *Attorney, Agent, or Firm* — Fish & Richardson P.C.

(57) ABSTRACT

This document describes techniques for expanding user groups while preserving user privacy and data security. In one aspect, a method includes receiving, by a content platform and from a client device of a user, a request for a digital component that also includes a user identifier. A determination is made that the user identifier is included in a user list that includes multiple user identifiers respectively corresponding to multiple users in a user action group. In response to determining that the unique identifier is included in the user list, a digital component of the entity for which the user list is generated is selected and provided to the client device of the user for display to the user of the client device.

20 Claims, 6 Drawing Sheets

(56) References Cited

OTHER PUBLICATIONS

GitHub.com [online], "Whitepaper: Evaluation of Cohort Algorithms for the FLoC API," Oct. 2020, retrieved on Aug. 6, 2021, retrieved from URL<https://github.com/google/ads-privacy/blob/master/proposals/FLoC/FLOC-Whitepaper-Google.pdf>, 17 pages.

Support.Google.com [online], "About remarketing," Aug. 2021, retrieved on Aug. 6, 2021, retrieved from URL<https://support.google.com/google-ads/answer/2453998?hl=en>, 2 pages.

Support.Google.com [online], "Building a privacy-first future for web advertising," Jan. 2021, retrieved on Aug. 6, 2021, retrieved from URL<https://blog.google/products/ads-commerce/2021-01-privacy-sandbox>, 6 pages.

* cited by examiner

PRIVACY PRESERVING USER GROUP EXPANSION

CROSS-REFERENCE TO RELATED APPLICATION

This application is a continuation application of, and claims priority to, U.S. patent application Ser. No. 17/397,089, filed on Aug. 9, 2021. The disclosure of the foregoing application is incorporated herein by reference in its entirety for all purposes.

TECHNICAL FIELD

This specification relates to data processing and machine learning models.

BACKGROUND

A client device can use an application (e.g., a web browser, a native application) to access a content platform (e.g., a search platform, a social media platform, or another platform that hosts content). The content platform can display, within an application launched on the client device, digital components (a discrete unit of digital content or digital information such as, e.g., a video clip, an audio clip, a multimedia clip, an image, text, or another unit of content) that may be provided by one or more content source/platform.

SUMMARY

In general, one innovative aspect of the subject matter described in this specification can be embodied in methods and systems that include receiving, by a content platform and from a client device of a user, a request for a digital component, wherein the request includes a user identifier that uniquely identifies the user to the content platform; determining that the user identifier is included in a user list that includes multiple user identifiers respectively corresponding to multiple users in a user action group, the multiple user identifiers including (i) a first set of user identifiers for a first set of users that performed one or more particular actions at an electronic resource of an entity for which the user list is generated and (ii) a second set of user identifiers for a second set of users that have been added to the user list based at least in part on each user in the second set of users being in a same user interest group of multiple user interest groups as at least one user in the first set of users, wherein each user interest group in the multiple user interest groups includes users that have been assigned to the user interest group by applications running on devices of the users based at least in part on electronic resources visited by the users; in response to determining that the unique identifier is included in the user list, selecting a digital component of the entity for which the user list is generated; and providing, to the client device of the user, the digital component for display to the user of the client device.

These and other implementations can each optionally include one or more of the following features. In some aspects, the method includes identifying a third set of users that are in the same user interest group as at least one user in the first set of users; and generating an intermediate user list with the third set of users. In some aspects, the method also includes identifying, for each user in the third set of users, a geographic identifier that indicates a geographic location of the user; and selecting, for inclusion in the second set of users, each user in the third set of users for which the geographic identifier satisfies a location condition for the user list. In yet some aspects, the method also includes identifying, for each user in the third set of users, a level of online activity of the user; ranking the third set of users in the intermediate list based on the level of online activity of each user in the third set of users; and selecting, for inclusion in the second set of users, a proper subset of the third set of users based on the ranking. Moreover, in some aspects, the level of online activity for each user is measured in a predefined time period ending at a time at which the user list is generated.

Some aspects can include identifying, for each user in the third set of users, user embeddings that indicate user preferences of the user; ranking the third set of users in the intermediate list based on the user embeddings for each user in the third set of users; and selecting, for inclusion in the second set of users, a proper subset of the third set of users based on the ranking.

In some aspects, the method can include generating, for each user in the third set of users, a score based on a set of data including (i) the user identifier associated with the user, (ii) the user interest group, (iii) an entity group of the entity, (iv) electronic resources of the entity, and (v) keywords associated with the entity; and selecting, for inclusion in the second set of users, each user having a score that satisfies a threshold score condition for the user list. In some aspects, generating, for each user in the third set of users, a score can include receiving the set of data; providing the set of data as input to a machine learning model that was trained to correlate training sets of data with likelihood of a user performing one or more specified actions to determine first and second arrays, wherein the first array corresponds to a user embedding associated with the user and the second array corresponds to an entity embedding associated with the entity; determining a distance between the first array and the second array; and assigning the score for the user based on the determined distance between the first array and the second array. In some aspects, the method can also include ranking the third set of users in the intermediate list based on the assigned score for each user in the third set of users; and selecting, for inclusion in the second set of users, each user from the ranked intermediate list having the assigned score that exceeds the threshold score condition for the user list. In yet some aspects, the machine learning model is a deep neural network (DNN).

The subject matter described in this specification can be implemented in particular embodiments so as to realize one or more of the following advantages. The techniques described in this document can generate user interest groups that include users that have similar interests and expand the membership of other groups, e.g., user action groups, using the memberships of the user interest groups while preserving the privacy of users, e.g., without the need to send users' online activity to content platforms or otherwise leak the users' cross-domain online activity to other computing systems or parties or use the users' cross-domain private information to expand user group membership. This protects user privacy with respect to such platforms and preserves the security of the data from breaches during transmission to or from the platforms.

Historically, third party cookies (e.g., cookies from a different domain than the resource being rendered by a client device) have been used to collect data from client devices across the Internet. However, some browsers block the use of third party cookies and third party cookies are increasingly being removed from use, thereby preventing the collection of data using third party cookies. This creates a problem when attempting to utilize collected data to segment data, make inferences, or otherwise utilize data to enhance online browsing experiences. In other words, without the use of third party cookies, much of the data previously collected is no longer available, which prevents computing systems from being able to use that data to group users based on shared interests, activities performed by the users at particular web pages or other resources, to enhance the online experience for users, and/or to transmit relevant digital components to larger groups of users.

The techniques described herein can solve hurdles that may arise from the eradication of third party cookies. For example, the disclosed techniques can provide for anonymizing user information, and assigning user identifiers of users to user interest groups that can be used to associate users within the groups as having similar interests. The disclosed techniques can also provide for expanding groups, e.g., user action groups that include users that have performed the same or similar actions at resources of publishers, by adding users that are part of a same user interest group as at least one user in a user action group to the user action group. The expanded user action group can then be refined or otherwise used to select which users in the user action group to send relevant digital components. Selecting the users for inclusion in the user action group can be based on a variety of signals, e.g., rather than personal or sensitive user information. These signals can include, for example, coarse geographic location information (e.g., a country code that indicates the country in which the user is located), user embeddings that encode other user information (e.g., interests of the user), landing page features for landing pages of digital components, and/or likelihood of performing some action in response to receiving a digital component. Thus, the disclosed techniques can provide for delivery of relevant digital components to large groups of users sharing similar interests without the use of third party cookies.

Moreover, the disclosed techniques can preserve privacy of users. Grouping users into interest groups, can be performed on-device rather than broadcasted over the Internet or another network. Private or personal information of the users may not be divulged over network connections, nor may private or personal information be used in grouping users based on interests. The users can then be grouped into user action groups at a remote server using user group identifiers that are assigned to the users when grouped into the interest groups at client devices. These techniques can therefore preserve user privacy and protect the security of personal information.

The techniques described herein can enable the expansion of user groups based on similarities in user information without the use of third party cookies. For example, user group identifiers can be used as additional signals to enhance audience expansion models that may be used to expand user groups. As mentioned above, user privacy can be preserved without negatively impacting or otherwise hindering the ability to expand the user groups. Using the user group identifiers can also provide, in some cases, better user group expansion than achievable using third-party cookies.

Moreover, the techniques described herein can be used to improve predictions of whether users will perform a specified action in response to viewing one or more digital components that may be displayed to the users. One or more machine learning models can be used to predict the likelihood of a user performing the specified action. User features (e.g., that are encoded as user embeddings) and landing page features, as well as user interest group identifiers can be used as inputs to the machine learning models. Digital component provider features as well as provider group identifiers can also be used as inputs. Such a variety of inputs can improve accuracy in predicting likelihoods that users will perform some specified actions in response to receiving digital components of particular providers. Thus, the techniques described in this document can be used to improve selection of digital components for groups of users sharing similar interests and/or that have performed similar actions. The techniques described in this document can also be used to improve adding users to the groups based on whether the users may perform some specified actions in response to receiving the digital components (e.g., clicking on the digital component, downloading an application, completing a sequence of tasks, registering for a newsletter, or acquiring a product or service, etc.).

As a result of such post-processing techniques, accuracy in selecting users to receive the digital components can be improved such that irrelevant digital components are not provided to client devices of the selected users. Providing irrelevant digital components to the client devices may waste bandwidth, battery usage, etc. of the client device. The disclosed techniques, on the other hand, can reduce excessive usage of resources at the client devices, thereby providing for the client devices to run more efficiently.

As another result of such post-processing techniques, expanded user action groups may include only users that are most similar, such that data storage space may not be wasted or otherwise utilized to store data about other users that are not as similar. When data storage space is efficiently used, available data storage space can then be used to store data about users in other user action groups. Therefore, more user action groups can be generated to target a variety of different users sharing similar interests. Efficient use of the data storage space can also be beneficial to reduce processing time needed to retrieve information about the user action groups and users that are part of such groups, select digital components to provide to users in the user action groups, and provide those digital components to the users.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for expanding user groups (e.g., user action groups)

while preserving user privacy and ensuring data security, even in situations where third party cookies are blocked or otherwise eradicated, and/or collection of user profiles is infeasible due to a variety of reasons. In general, rather than processing user information at computing systems of other entities, such as content platforms or web servers, user information related to resources visited by the users can be processed at the client devices of the users. User privacy can be preserved by grouping users into larger, anonymous groups, which are referred to herein as user interest groups. Each anonymous group can be related to a particular topic and have a shared user group identifier, which can be used to identify the user interest group that includes the user as a member rather than identifying the actual user. For example, when requesting customized content or a digital component for a user, the client device can send the user group identifier rather than a user identifier that identifies the user with the request. In this way, the particular topic of the user interest group can be used to customize the content or selection of a digital component.

Using the disclosed techniques, other types of user groups can be expanded based on membership of the user interest groups. For example, a user action group can include users that have performed a specified action (e.g., viewed a particular item) at an electronic resource of a publisher that publishes the electronic resource and that may also distribute digital components for the electronic resource or products/services offered by the electronic resource. As such lists may be small if only a few users have performed the action, it can benefit the publisher to expand the user action group to include other users that may be similar to the users that have performed the action. The techniques described in this document can leverage the membership of user interest groups to expand such user action groups to include additional users that are considered to be similar to the users that performed the specified action.

Post-processing, selection, and/or ranking techniques can be used to refine the expanded user action groups such that users that may not be as similar or that may not be as likely to perform the specified action of the user action groups are filtered from the expanded user action groups. Post-processing, selection, and/or ranking techniques can be based on one or more signals, including but not limited to user geographic location, user embeddings, digital component provider embeddings, landing page features, and likelihood that the users will perform particular actions in response to viewing digital components.

Example System for Generating and Expanding User Lists

Figure 1:
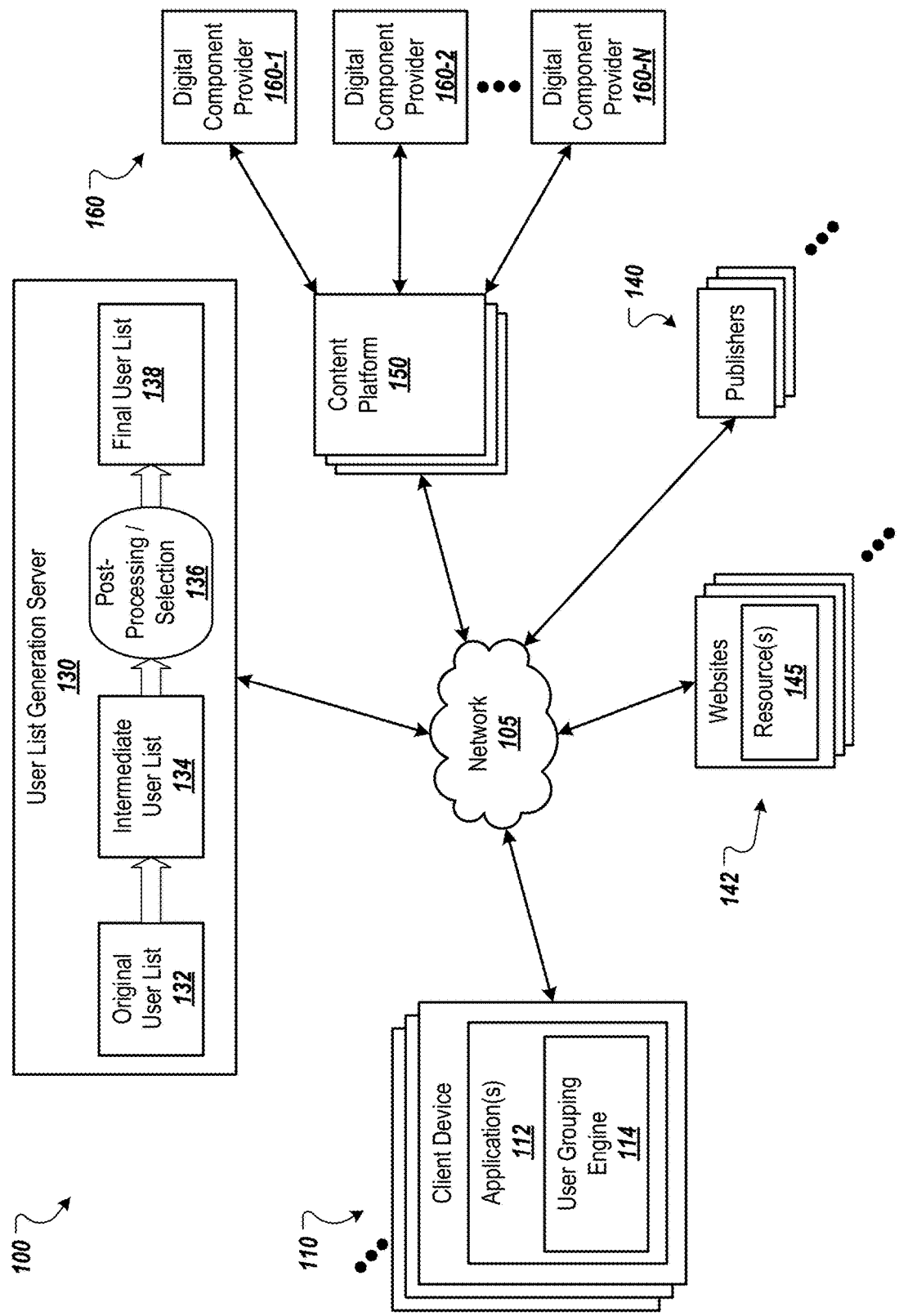
FIG. 1 is a block diagram of an environment in which example user lists for user groups can be generated, expanded, and used to distribute and/or customize content.

FIG. 1 is a block diagram of an environment 100 in which example user lists for user groups can be generated, expanded, and used to distribute and/or customize content. The example environment 100 includes a data communication network 105, such as a local area network (LAN), a wide area network (WAN), the Internet, a mobile network, or a combination thereof. The network 105 connects the client devices 110, a user list generation server 130, publishers 140, websites 142, and content platforms 150. The example environment 100 may include many different client devices 110, user list generation servers 130, publishers 140, websites 142, and content platforms 150.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, or a gaming device or console.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

The application 112 can also include a user grouping engine 114. For example, a web browser can be configured to include a user grouping engine 114. The user grouping engine 114 can be part of the code (e.g., scripts) that is executed at the client device 110 when the application 112 is loaded therein. The user grouping engine 114 can be configured to associate the client device 110 with a particular website 142 and/or resource 145 that is presented at the application 112. That is, when the application 112 navigates to a particular resource, the application 112 can update a list of resources to which the application 112 has navigated. This list can include resources to which the application 112 has navigated over a given time period, e.g., for the past week, two weeks, month, or another appropriate time period.

The user grouping engine 114 can use the list of resources to assign the user of the client device 110 to a user interest group. Each user interest group can include users that are determined to be similar, e.g., based on the resources visited by the users. For example, users that visit similar resources can be considered similar and assigned to the same user interest group. As another example, using machine learning algorithms and techniques, user interest groups can include users that visit same websites 142, select same or similar content on those pages, and/or other factors or contextual signals. As an illustrative example, a user interest group can be based on geographic location of the users that visit the website 142, another user interest group can be designated for users that visit a sale page on the website 142, another user interest group can be designated for users that put electronics in their shopping cart on the website 142, another user interest group can be designated for users that search for items that can be picked up in store, etc. Each user interest group can also include a category, e.g., a category of interest for each user in the user interest group, and a user interest group identifier that uniquely identifies the user interest group. Importantly, the user grouping engine 114 can assign the user of the client device 110 to a user interest group at the client device 110 without providing any of the resource visitation information to another device or receiving information about any other user, thereby preserving user privacy.

Adding the user of the client device 110 to the user interest group can include assigning the user interest group identifier to the client device 110. The user grouping engine 114 can analyze the list of resources visited by the user on a recurring basis, e.g., periodically, to assign the user to a user interest group. Thus, the user interest group to which a user is assigned can change over time. However, the history of user interest groups for a user may not be maintained. Instead, the application 112 may only maintain the user interest group identifier for the current user interest group to which the user is assigned. This preserves the user's privacy with respect to user group membership over time. When requesting a digital component from the content platform 150, the application 112 can provide, with the request, the user interest group identifier rather than a user identifier that identifies the actual user of the client device 110. As a result, the client device 110 may not be identifiable by private or personal information of the user of the client device 110, thereby preserving user privacy. These user interest groups can be used in generation and expansion of user lists for other user groups (e.g., original user list 132) for delivery of digital components, as described further below.

As mentioned above, generation of the groupings or cohorts can be done at the client devices 110 and may not be uploaded elsewhere, which is beneficial to ensure user privacy. The user grouping engine 114 can ensure that groupings are well distributed to represent large quantities of users sharing similar interests. The larger the grouping, the less likely that any individual user can be tracked, thereby increasing and preserving user privacy. The user grouping engine 114 can also leverage anonymization methods, such as differential privacy, in order to further protect private information associated with users in the groupings. A SimHash algorithm, for example, can be applied to registrable domains of the websites 142 visited by users in order to cluster the users that visit similar websites 142. As another example, one or more federated learning methods can be used to estimate client models in a distributed fashion. The generated groupings can have similar browsing behaviors, and the identifier associated with the groupings, such as a user group identifier, can be used as a privacy-first replacement for pseudonymous identifiers used in serving digital components to client devices 110.

Digital component providers 160 can create (or otherwise publish) digital components that are presented in digital component slots of publisher's resources and applications. The digital component providers 160 can use the content platform 150 to manage the provisioning of its digital components for presentation in digital component slots. In general, the content platform 150 can receive a request for digital components (e.g., from client device 110), select a digital component for presentation at the client device 110, and provide, to the client device 110, data that causes the client device 110 to present the digital component.

In some implementations, the content platform 150 is also a content publisher or other online service provider. For example, the content platform 150 may publish within native applications and/or web pages, news articles, videos, etc. In another example, the content platform 150 can provide e-mail services, host a video sharing site, etc. With this electronic content, the content platform 150 can select and display digital components, e.g., digital components received from the digital component providers 160.

When a user performs a particular action at a resource, e.g., using the application 112, the user can be added to a user list for a user action group. Each user action group can include users that have performed a specified action at an electronic resource. For example, a user action group can include users that requested more information about a particular item, or added the particular item to a virtual basket or cart. In response to detecting the specified user action, the owner of the user action group (e.g., the user grouping engine 114 of the application 112, the digital component providers 160, or the websites 142) can add the user to the user list for the user action group corresponding to the specified action. For example, if the action occurs on a web page of a publisher 140, the web server hosting the web page can receive, from the application 112, data identifying the user action and a user identifier that identifies the user. In response, the web server can add the user identifier for the user to the user list corresponding to the specified action. To get such user identifier, the user may have to be logged into the web page as the application 112 may not be configured to provide any universal user identifier that identifies a user to publishers 140 or other entities, to preserve user privacy.

The content platforms 150 can use the user group membership of a user, e.g., the user interest group and/or user action group(s) that include the user as a member, to select digital components or other content that may be of interest to the user or may be beneficial to the user/user device in another way. For example, such digital components or other content may include data that improves a user experience, improves the running of a user device, or benefits the user or user device in some other way.

The type of group that can be used for a particular user can vary based on the resource with which a digital component will be displayed. If the user is logged into an electronic resource of the content platform 150 and the content platform 150 maintains the user list corresponding to the user action group and the user identifiers included in the user list, the content platform 150 may have access to the user identifier for the user and be able to determine the group(s)

that include the user as a member. However, if the user is not logged into an electronic resource of the content platform 150, the content platform 150 may only have access to the user group identifier for the user interest group that is received from the application 112 with a digital component request. In this example, the content platform 150 can select a digital component based on the user interest group rather than the user action group.

In some cases, it is beneficial to users and to digital component providers to expand user groups, e.g., user action groups, to include users that have similar interests or other similar data as the users that are already members of the user group. Usefully, the techniques described in this document enable this to be achieved without the use of third party cookies. For example, a first user may be part of a user interest group related to ski resorts and can be part of a user action group based on performing a specified action, such as purchasing a ski pass at a ski resort. A second user can also be part of the same user interest group related to ski resorts but may not be part of the user action group since the second user has not purchased a ski pass. Regardless, because the first and second users are in the same user interest group (and therefore share a same or similar interest in ski resorts), the user action group can be expanded to include an identifier of the second user. The second user can subsequently receive digital components or customized content that is related to the user action group (which is purchasing ski passes). Therefore, user action groups may be expanded to include other users having similar user data and interests (e.g., being part of the same user interest group(s)) without using or otherwise exposing private or personal information of the users.

The user list generation server 130 can be configured to generate and expand user action groups to include users that are grouped together based on similar or shared interests (e.g., in user interest groups). The user list generation server 130 can be separate from the user grouping engine 114 and in communication with the client devices 110. Moreover, in some implementations, the user list generation server 130 can be part of the content platform 150. For example, the content platform 150 can maintain user lists for user action groups for one or more digital component providers 160 that engage the content platform 150 to distribute digital components on behalf of the digital component provider(s). Such a content platform 150 can also expand the user action groups based on the user interest group membership of the users. The user list generation server 130 can also be separate from the content platform 150 and in communication with the content platform 150.

The original user list 132 can include user identifiers that uniquely identify users who visit the websites 142 and/or perform specified actions thereon. For example, the original user list 132 can be a user list for a user action group. The user list for a user action group can include the user identifiers for each user that performed the specified action.

The user identifier for a user can be a first party identifier that the content platform 150 uses to uniquely identify the user. For example, the user identifier can be the username that the user uses to log into the electronic resource(s) of the content platform 150 or another appropriate identifier.

As part of expanding a user action group, the user list generation server 130 can generate an intermediate list 134 based on the groupings that are determined by the user grouping engine 114 at the client devices 110. That is, the user list generation server 130 can expand the user action group based on the user interest group membership of the users in the user action group.

To perform such expansion, the user list generation server 130 can identify, for at least some of the users, the user action group(s) that include the user as a member and the user interest group that includes the user as a member. In some implementations, the user list generation server 130 can map the user identifier that uniquely identifies the user to the content platform 150 with the user group identifier for the user interest group that includes the user as a member. With such a mapping, the user list generation server 130 can identify the user identifiers for the users in a user list for a user action group and use the mapping to identify the user interest group for each user in the user list.

In some implementations, the content platform 150 can map the user identifier to a user interest group when the user is logged into a service provided by the content platform 150. When the user is logged in, the content platform 150 knows who the user is based on the log in credentials. In addition, the content platform 150 can obtain the user group identifier for the user interest group that the user is a member from the client device 110 of the user while the user is logged into the service, e.g., in a similar manner as other content providers can query the user group identifier for the user interest group. Any content platform, publisher, or digital component provider that maintains a first party identifier for a user and that obtains the user group identifier for the user interest group of the user can perform the same mapping.

In some implementations, the content platform 150 obtains the user group identifier for the user interest group that includes the user as a member using a script. The script can obtain the user group identifier when a Hypertext Transfer Protocol (HTTP) request or another request for content is received from the client device 110 of the user.

The intermediate list 134 can include users who may be part of the original user list 132. The user list generation server 130 can then identify, for each user in the original user list 132, a user interest group to which the user belongs. The user list generation server 130 can add users from each of those identified user interest groups to the original user list 132 in order to generate the intermediate list 134. Therefore, the original user list 132 can be expanded into the intermediate list 134 to include users who share common interests, as indicated by common user interest group membership.

In some implementations, post-processing and/or selection techniques 136 can also be performed by the user list generation server 130 in order to refine the intermediate list 134. For example, this refinement can be to include users that are most similar to the users in the original user list 132 and/or users that are more likely to perform a specified action corresponding to the original user list 132. In another example, the refinement can be to filter the intermediate user list 134 to remove inactive users.

The post-processing and/or selection techniques 136 can include ranking and/or scoring the users in the intermediate list 134 based on a variety of signals. For example, the user list generation server 130 can select users from the intermediate list 134 based on signals that include geographic location (e.g., country code), online activity (e.g., level and/or type of activity over a predetermined timeframe, such as past 3, 7, and/or 30 days), user embeddings, digital component provider embeddings, distances between or other comparisons of user and digital component provider embeddings, likelihood of a user performing a specified action in response to viewing digital components, landing page features (e.g., user query embedding, digital component provider landing page query embedding, user and digital component provider query overlap count), and/or groupings or cluster features (e.g., user grouping ID, digital component provider ID, user and digital component provider grouping overlap). The user list generation server 130 can use only one of these signals to post-process the intermediate list 134. In some implementations, the user list generation server 130 can use more than one of these signals to post-process the intermediate list 134. Any combination and weighting of such signals can be used to determine and select users from the intermediate list 134 to remain in a final user list 138.

Based on the post-processing and/or selection techniques 136, the user list generation server 130 can generate a final user list 138. Users in the final user list 138 can receive digital components that are relevant to the category for the original user list 132 that was expanded to arrive at the final user list 138. For example, if the original user list 132 is for users that selected to view a recipe for a particular dish, the users in the final user list 138 can be provided digital components related to the particular dish, restaurants that serve the particular dish, etc.

In some implementations, the final user list 138 may include a subset of the users from the original user list 132. For example, the subset can be a proper subset that includes at least one member of the original user list 132 but does not include every member of the original user list 132. In some implementations, the final user list 138 can include a subset of the users in the intermediate user list 134. For example, this subset can be a proper subset that includes at least one member of the intermediate user list 134 but does not include every member of the original user list 132. In yet some implementations, the final user list 138 can include any quantity of users from the original user list 132 and/or the intermediate user list 134.

As described and referenced herein, the original user list 132 can also be referred to as a first set of users. The intermediate user list 134 can also be referred to as a second set of users. The final user list 138 can also be referred to as a third set of users. Moreover, in some implementations, the intermediate user list 134 can be referred to as an additional set of users and the final user list 138 can be referred to as a candidate set of users.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example Process for Providing Digital Components to Client Devices

Figure 2:
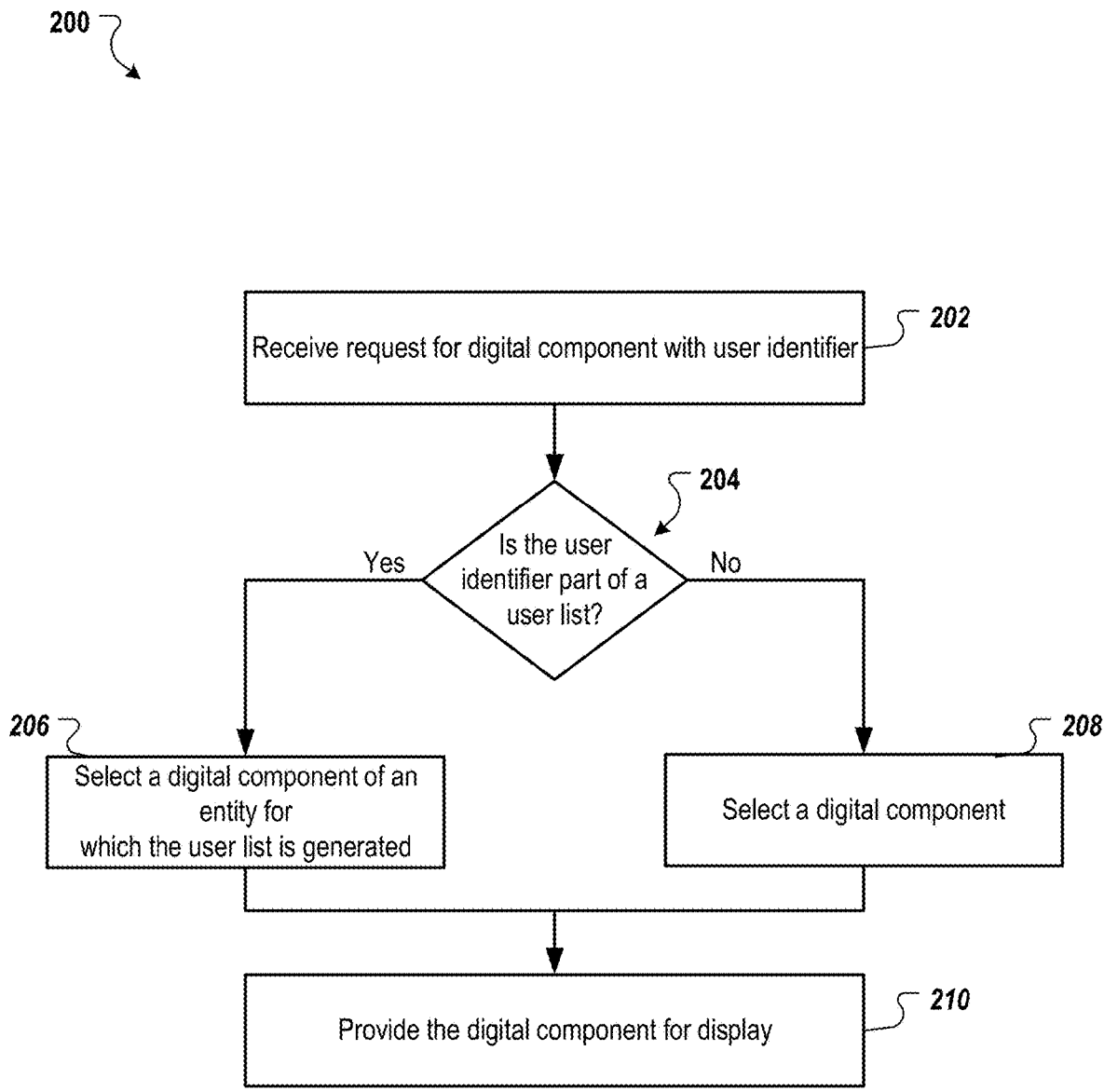
FIG. 2 is a flow diagram that illustrates an example process for providing a digital component to a client device.

FIG. 2 is a flow diagram that illustrates an example process 200 for providing a digital component to a client device. Operations of the process 200 can be implemented, for example, by content platforms. One or more operations of the process 200 can also be performed by other components described herein, such as the user list generation server, web browsers, client devices, and/or the user grouping engine. Operations of the process 200 can also be implemented as instructions stored on one or more computer readable media which may be non-transitory, and execution of the instructions by one or more data processing apparatus can cause the one or more data processing apparatus to perform the operations of the process 200.

Referring to the process 200, a content platform receives a request for a digital component in 202. The request can be received from a client device of a user. As described herein, web pages and native applications can have open slots or portions thereon where digital components can be hosted and displayed. The digital components that are hosted and displayed can be chosen based on preferences or interests of the user. The request can include a user identifier that uniquely identifies the user to the content platform. Each content platform, publisher, or other web entity, for example, can have different identifications or schemes for identifying their users. These entities may not be aware of the user identifiers for other entities and the user identifiers may not be used to identify the user to multiple entities. That is, the user identifiers may be entity-specific such that user activities cannot be tracked across different domains. Such entity-specific identifiers can also be referred to as first-party identifiers as they are specific to the one party.

The content platform can determine whether the user identifier is part of a user list (204). The user list can be a final user list (e.g., for a user action group), such as the final user list 138 in FIG. 1. The user list can include multiple user identifiers respectively corresponding to multiple users. The multiple user identifiers can include an original set of user identifiers for an original set of users that performed one or more particular actions at an electronic resource or webpage for an entity, such as a digital component provider, for which the user list is generated. For example, the original set of user identifiers can be generated by a web browser or application that is hosted on a client device, or by a website or content platform that detects the user action when the user is logged into an electronic resource of the website or content platform. The original set of user identifiers can identify any users that perform the particular action(s) at the web browser or application.

The user list for the user action group can be expanded to include user identifiers for users that are in the same user interest group as the users that are in the user list based on performing the particular user action(s) corresponding to the user action group. The user list, having the additional user identifiers, can then be refined or otherwise used to select which users in the user list (e.g., the user action group) to send relevant digital components. Selecting the users for inclusion in the user list can be based on a variety of signals, e.g., rather than personal information, as described further below.

For example, users who are interested in a particular category of products can be grouped into a user interest group related to the particular category of products. One of the users can also be part of a user action group (e.g., a user list) based on selecting an item from the particular category of products and adding the item to a virtual shopping cart. Any of the other users in the same user interest group as the one user can then be added to the user action group in order to expand this user action group. Therefore, the user action group can be expanded to include more users who have similar interests and online activity as users already in the user action group. Thus, the added users, as well as the one user who added the item to the virtual shopping cart, can receive digital components related to the particular category of products.

If the user identifier is part of the user list, the content platform selects a digital component of an entity for which the user list is generated (206). The entity can be a digital component provider or other content platform as described herein. Thus, if the user identifier is part of the user list, then the user identified by the user identifier has either performed a particular action corresponding to the user list and/or has been determined to share similar interests and/or actions with other users in the user list.

If the user identifier is not part of the user list (e.g., user action group), then the content platform can select a digital component based on other information (208). For example, the content platform can select a digital component based on user interest group membership for the user (e.g., if the request includes a user interest group identifier for the user), contextual information for an environment in which the digital component will be displayed, and/or other appropriate information.

In some implementations, the content platform selects a digital component based on multiple parameters, including membership of the user in one or more user lists corresponding to user action groups, membership of the user in a user interest group, contextual information, etc. In this example, digital components related to a group (e.g., digital components that are part of a campaign for one of the groups) can be boosted in a ranking of candidate digital components based on the user being in that group.

The content platform then provides the selected digital component for display at the client device of the user (210). The digital component can be displayed in a portion or portions of the web browser or application that is displayed at the client device.

Example Process for Generating User Lists

Figure 3:
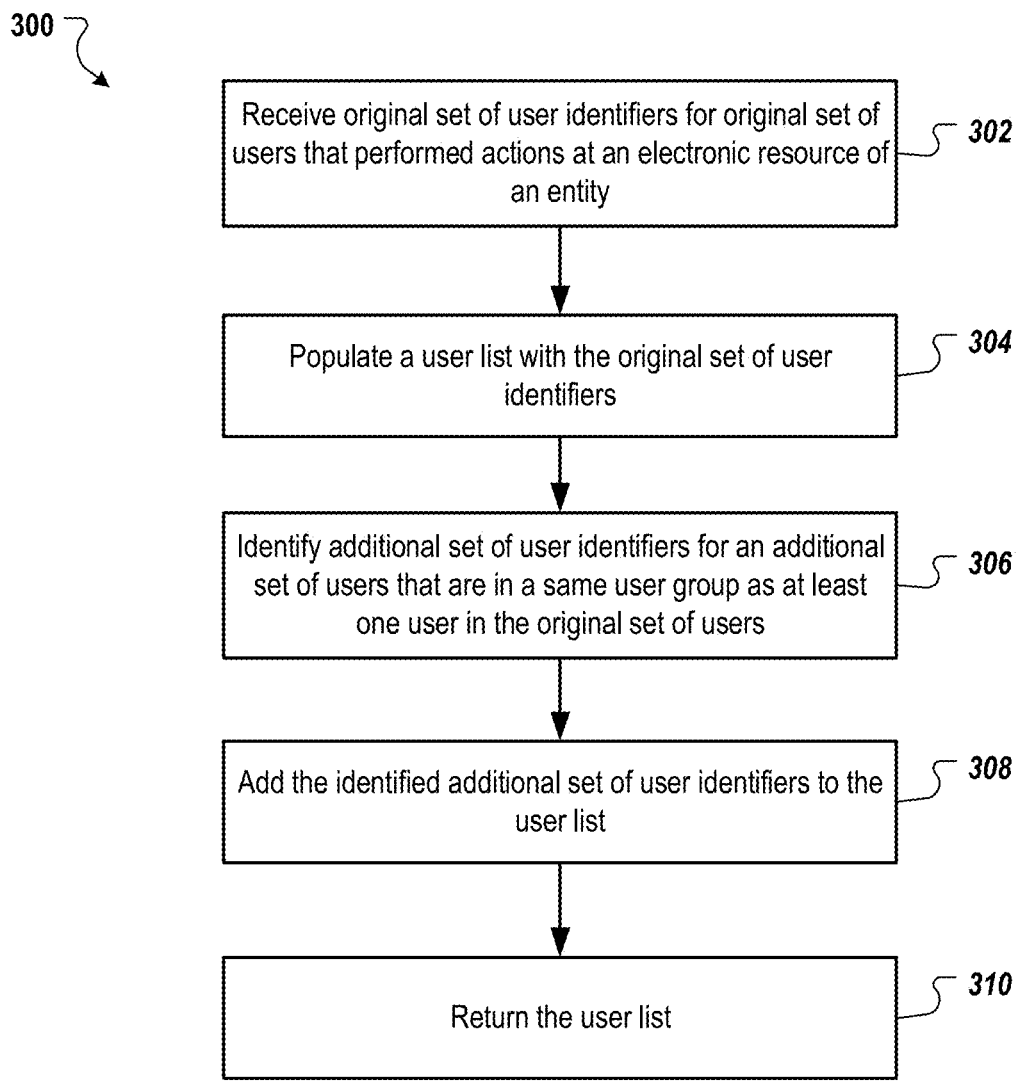
FIG. 3 is a flow diagram that illustrates an example process for generating a user list.

FIG. 3 is a flow diagram that illustrates an example process 300 for generating a user list for a user group (e.g., a user list for a user action group). One or more operations of the process 300 can be implemented, for example, by the content platforms 150, the user list generation server 130, and/or the user grouping engine 114. Operations of the process 300 can also be implemented as instructions stored on one or more computer readable media which may be non-transitory, and execution of the instructions by one or more data processing apparatus can cause the one or more data processing apparatus to perform the operations of the process 300. One or more other components described herein can perform the operations of the process 300.

Referring to the process 300, the user list generation server can receive an original set of user identifiers for an original set of users that performed actions at an electronic resource (e.g., website, webpage, application, etc.) of an entity (e.g., digital component provider or publisher) (302). The original set of user identifiers can include users who perform actions on websites of digital component providers. For example, the original set of users can include users that select certain products, add those products to online shopping carts, and/or purchase those products. The original set of users can also include users that perform other actions on web pages or applications, such as clicking on links, searching, and spending certain amounts of time on one or more web pages. The original set of user identifiers can be a user list for a user action group that includes users that each performed one or more particular actions at one or more electronic resources of a publisher or digital component provider.

The user list generation server populates a user list with the original set of user identifiers in 304. As described throughout this document, the user list generation server can continue to update the user list by adding user identifiers to the user list. The user list can be updated at predetermined times. The user list can also be updated randomly at one or more different times. In some implementations, the user list can be continuously updated using the techniques described herein. The user list can be for a user action group that includes users that have performed the same or similar actions at resources (e.g., web pages), or for another type of user group. The user list can be expanded to include more users who share similar interests and are likely to perform the some action in response to receiving a digital component.

For example, the user list generation server identifies an additional set of user identifiers for an additional set of users that are in a same user group (e.g., same user interest group) as at least one user in the original set of users in 306. As mentioned in reference to the process 200 in FIG. 2, the original set of user identifiers can include all users that perform actions on an electronic resource of an entity (e.g. a publisher or digital component provider). Some of these users can further be grouped into groupings, clusters, or cohorts based on the resources visited by the users (e.g., user interest groups). For example, a portion of the users in the original set of users can be grouped together based on purchasing or otherwise clicking on clothing. Another portion of the users in the original set of users can be grouped together based on clicking on gardening equipment. Here, in 306, the user list generation server can determine whether any users are also grouped into the cluster for clothing and/or the cluster for gardening equipment—in other words, the user list generation server can determine whether any of the users are in the same user interest group. If those users are in either cluster, those users can be identified in the additional set of user identifiers. These users can then be added to the user list (e.g., the user action group) in order to expand the user list.

In a particular example, the user list generation server can obtain the user identifier for each user in the original user list. For each of these user identifiers, the user list generation server can identify the user interest group that includes the user identified by the user identifier as a user, if any. After doing this for each user identifier in the original list, the user list generation server can identify the user identifiers in each identified user interest group. This additional set of user identifiers can include all the members of each user interest group that includes at least one member of the user action group as a member of the user interest group.

Next, the user list generation server adds the identified additional set of user identifiers to the user list in 308. Therefore, the user list generation server can expand the user list (e.g., the user action group) to include additional users who share common interests and/or actions as the users that are already part of the user list. By expanding the user list, the user list generation server (e.g., and/or the content platforms) can make more accurate determinations of which digital components to send to client devices of which users and/or which users should receive the digital components. Moreover, as described herein, expanding the user list can further improve privacy of the users in the user list. As more users are added to the user list, it can be more challenging to track or otherwise identify any individual user in the list, especially since the users are identified by unique identifiers and group identifiers rather than personal or private information.

The user list generation server returns the user list in 310. For example, the user list generation server can provide the expanded user list to the content platform for use in distributing digital components. As described further in reference to FIG. 4, the returned user list can be post-processed and/or ranked in order to identify which users should remain in the user list to receive relevant digital components based on the user's membership in the expanded user action group. In other words, the expanded user list can then be refined or otherwise used to select which users in the user list (e.g., the user action group) to send relevant digital components.

Example Processes for Adding Users to User Lists Based on Contextual Signals

Figure 4:
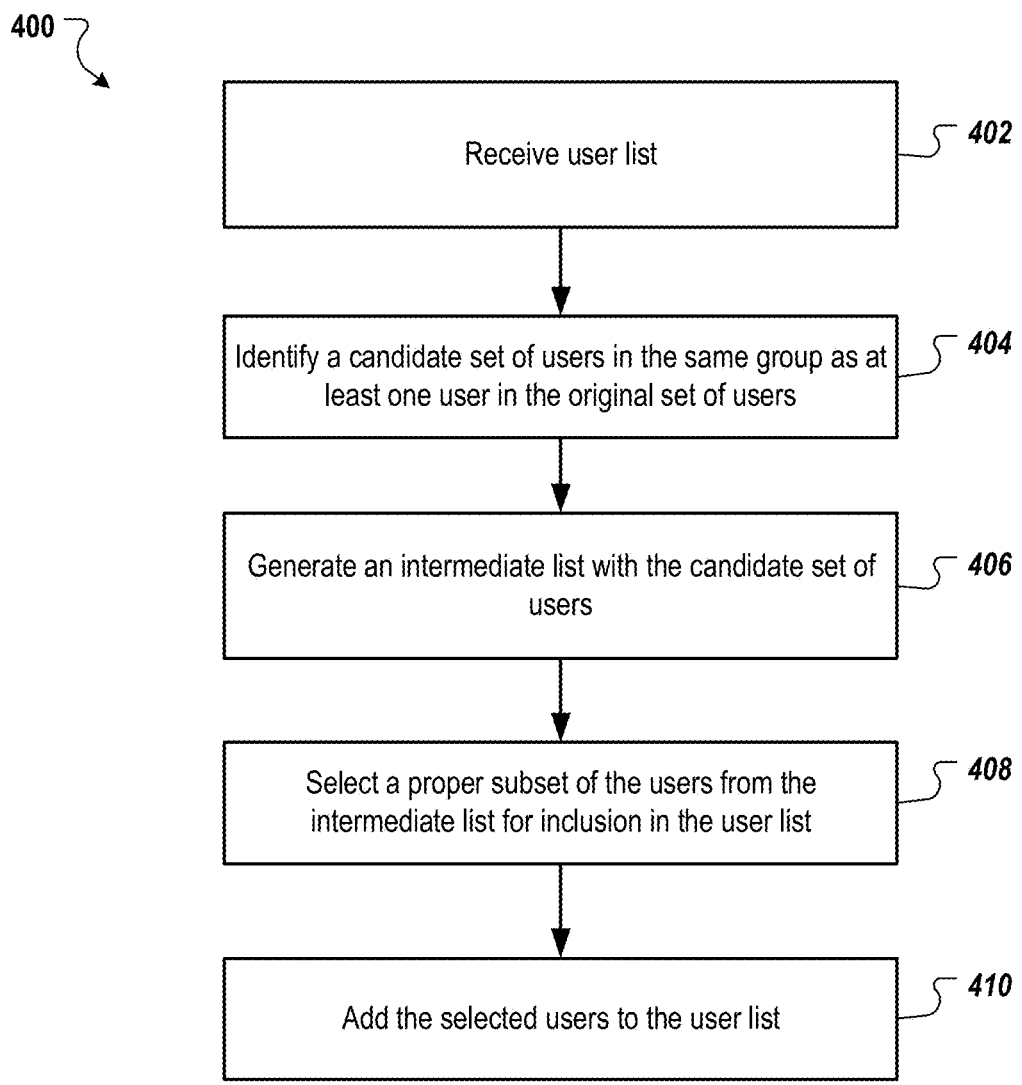
FIG. 4 is a flow diagram that illustrates an example process for adding users to the user list based on contextual signals.

FIG. 4 is a flow diagram that illustrates an example process 400 for adding users to the user list (e.g., user action group) based on one or more signals. Adding users to the user list can include post-processing and/or selection of users who should receive particular digital components. Adding users to the user list can also include ranking the users in the user list based on one or more contextual signals. The rankings can then be used to identify which users should receive one or more relevant digital components. In other words, the process 400 can be performed to refine an expanded user list to select which users in the expanded user list to send relevant digital components. Operations of the process 400 can be implemented, for example, by the user list generation server 130. One or more operations of the process 400 can also be performed by other components described herein, such as the user grouping engine 114 and/or the content platforms 150. Operations of the process 400 can also be implemented as instructions stored on one or more computer readable media which may be non-transitory, and execution of the instructions by one or more data processing apparatus can cause the one or more data processing apparatus to perform the operations of the process 400.

Referring to the process 400, the user list generation server receives the user list in 402. The user list can be the user list that is returned in 310 in the process 300 (e.g., refer to FIG. 3). For example, the user list can be an expanded user action group that includes users having similar interests as well as one or more users from an original user list (e.g., a user interest group).

The user list generation server identifies a candidate set of users in the same group as at least one user in the original set of users in 404. As described above, the user list generation server can identify users who are assigned a same group identifier as one or more of the users in the original set of users. For example, if a user in the original set of users is assigned a group identifier that corresponds to gardening and another user is also assigned a group identifier that corresponds to gardening, that other user can be identified in the candidate set of users. Thus, if a user is in a same user interest group as at least one user in the original set of users, then the user can be identified as a candidate user to be added to the user list.

Next, the user list generation server generates an intermediate list with the candidate set of users (406). Users that are part of the candidate set of users can be added to the intermediate list. The intermediate list may also include one or more of the users from the original user list, as described in reference to FIG. 1. The intermediate list can be a user action group that has been expanded based on membership of users in the same user interest group(s). The intermediate list can then be used in post-processing, ranking, and/or selection techniques in order to determine which users can receive relevant digital components. Thus, post-processing techniques can be used to refine the intermediate list (e.g., the expanded user action group) such that users that may not be as similar or that may not be likely to perform some specified action(s) associated with the intermediate list can be filtered out from the intermediate list. Those users that are filtered out may not receive digital components that relate to the specified action(s) associated with the intermediate list.

The user list generation server selects a subset of the users from the intermediate list for inclusion in the user list (408). Selecting the subset of the users can be part of post-processing and/or selection techniques 136 described in reference to FIG. 1 and further in FIG. 5. Selecting the subset of users for inclusion in the user list can be based on a variety of signals. The signals may include geographic location of the user's device, user embeddings that encode other user information, landing page features for landing pages of digital components, and/or likelihood of performing some action in response to receiving a digital component. For example, selecting the subset of the users can include identifying, for each user in the intermediate list, a geographic identifier that identifies a geographic location (e.g., a coarse geographic location) of the user and selecting, for including in the user list, each user in the intermediate list for which the geographic identifier satisfies a location condition for the user list. The location condition can be a country code that indicates a country in which the user is located. The location condition can also be a different geographic location of the user, such as a county code, town code, GPS coordinates, etc. In some implementations, the location condition may not be an exact geographic location of the user, which can be beneficial to preserve user privacy.

For example, users in the intermediate list that have a country code that is the same as the country code associated with the user list can be added to the user list. The country code associated with the user list can correspond to a location of a particular digital component provider. In other words, the users whose country or other geographic information matches with the digital component provider's country or other geographic information can be added to the user list and selected to receive the digital component of the provider. As an illustrative example, if a user in the intermediate list has an interest in sneakers, which is a same interest of other users in the user list, but a particular digital component provider is located in Europe and the user is located in the United States, then the user may not be added to the user list because the user's geographic identifier may not satisfy the location condition for the user list. The user, however, can be added to another user list that groups users based on the same interest in sneakers and a United States country code.

Selecting the subset of users can also include identifying, for each user in the intermediate list, a level of online activity of the user. The users in the intermediate list can be ranked based on their levels of online activity. A proper subset of users in the intermediate list can be selected for inclusion in the user list based on their ranking. The proper subset can include at least one member of the candidate set of users in the intermediate list but not all members of the intermediate list. Therefore, only users that satisfy a threshold level of online activity condition can be selected for inclusion in the user list.

The threshold level of online activity condition can be based on type and/or quantity of online activity over some predefined time period. The level of online activity for each user can be measured in a predefined time period ending at a time at which the user list is generated. For example, the predefined time period can be a past 3, 5, 7, 30 days, or any other desired time period that ends at a time at which the user list is generated. The predefined time period can also be a previous 24 hours or other minutes or hourly periods of time. The type and/or quantity of online activity can vary depending on the website, application, digital component provider, etc. For example, the level of online activity can be measured as a number of clicks made by the user, a number of purchases made by the user, how many items the user adds to their shopping cart, a number of webpages visited by the user during one or more sessions, etc. The level of online activity can also be measured as different types of actions that may be taken by the user, such as searching, clicking on different tabs or web pages, scrolling on different web pages, time spent idle on different webpages, etc. Moreover, in some implementations, the users in the intermediate list can be filtered, post-processed, and/or ranked based on pixel ping registration time stamps and the users' search query activity events. This can ensure, for example, that the users that are selected as part of the subset of users have search query activity around the pixel ping registration event.

In some implementations, selecting the subset of users may not include ranking the users based on the level of online activity. Sometimes, selecting the subset of users can be based on filtering the users in the intermediate list using one or more threshold conditions. For example, any users in the intermediate list having online activity over the prior 3 days that exceeds a threshold level and/or type of online activity can be selected as the proper subset for inclusion in the user list. In some implementations, this can be used in combination with other ranking techniques described in this document.

Selecting the subset of users can also include identifying, for each user in the intermediate list, user embeddings that encode user preferences of the user. The users in the intermediate list can also be ranked based on the user embeddings for each user. Moreover, a proper subset of the users in the intermediate list can be selected for inclusion in the user list based on the ranking. One or more machine learning models can be trained to generate multi-dimensional user embeddings for the users in the intermediate list. Users can have multiple interests, and each dimension of the user embedding for a user can represent a different user interest of the user. Users having values in dimensions that are represented by the user list can be selected as part of the proper subset and therefore added to the user list.

As mentioned above, selecting the subset of users may not include ranking the users in the intermediate list based on their user embeddings. Instead, the proper subset of users can be selected based on whether the user embeddings for the users satisfy one or more threshold conditions that correspond to user embeddings of the user list. The threshold conditions can include, but are not limited to, a total number users that make up an audience, such as a total number of users that an entity or digital component provider can deliver digital components to at a time. In some implementations, the one or more threshold conditions can be quality levels of one or more machine learning models that are used to generate multi-dimensional user embeddings for the users in the intermediate list.

Similarly, selecting the subset of users can be based on digital component provider embeddings that encode features of the digital component providers. Features of the digital component providers can include, but are not limited to, user activity (e.g., content that each of the subset of users viewed during one or more periods of time), a country where each of the subset of users is located, a time at which user activity or some other event occurs (e.g., 7 AM in the morning, 10 PM at night, etc.), and what device each of the subset of users is using. For example, a digital component provider embedding for a digital component provider can encode one or more user interest group identifiers (e.g., a top N user interest group identifiers) for the digital component provider, features of the digital component provider (e.g., categories of products/services of the digital component provider), and/or other appropriate information about the digital component provider. Selecting the subset of users can further be based on landing page features, which can include user query embedding and/or digital component provider landing page features. The user query embedding can contain information about what the user has searched for, such as search queries, search terms or phrases, etc. For example, a user can search on a webpage or other search tool for gardening tools. The user can type keywords into a search bar such as "soil," "plants," "plant pots," "shovel," etc. These keywords can be identified in this user's query embeddings. The landing page features can include signals of what webpages or other digital components the user has visited. In the example above where the user searched for gardening tools, the user may click on several webpage results, including one for products to purchase and another for gardening tips and tricks. URLs or other identifiers associated with each of these webpage results that the user clicked on can be identified in the landing page features. In some implementations, a proper subset of the intermediate list can be selected based on an overlap count between user and digital component provider query embeddings.

Figure 5:
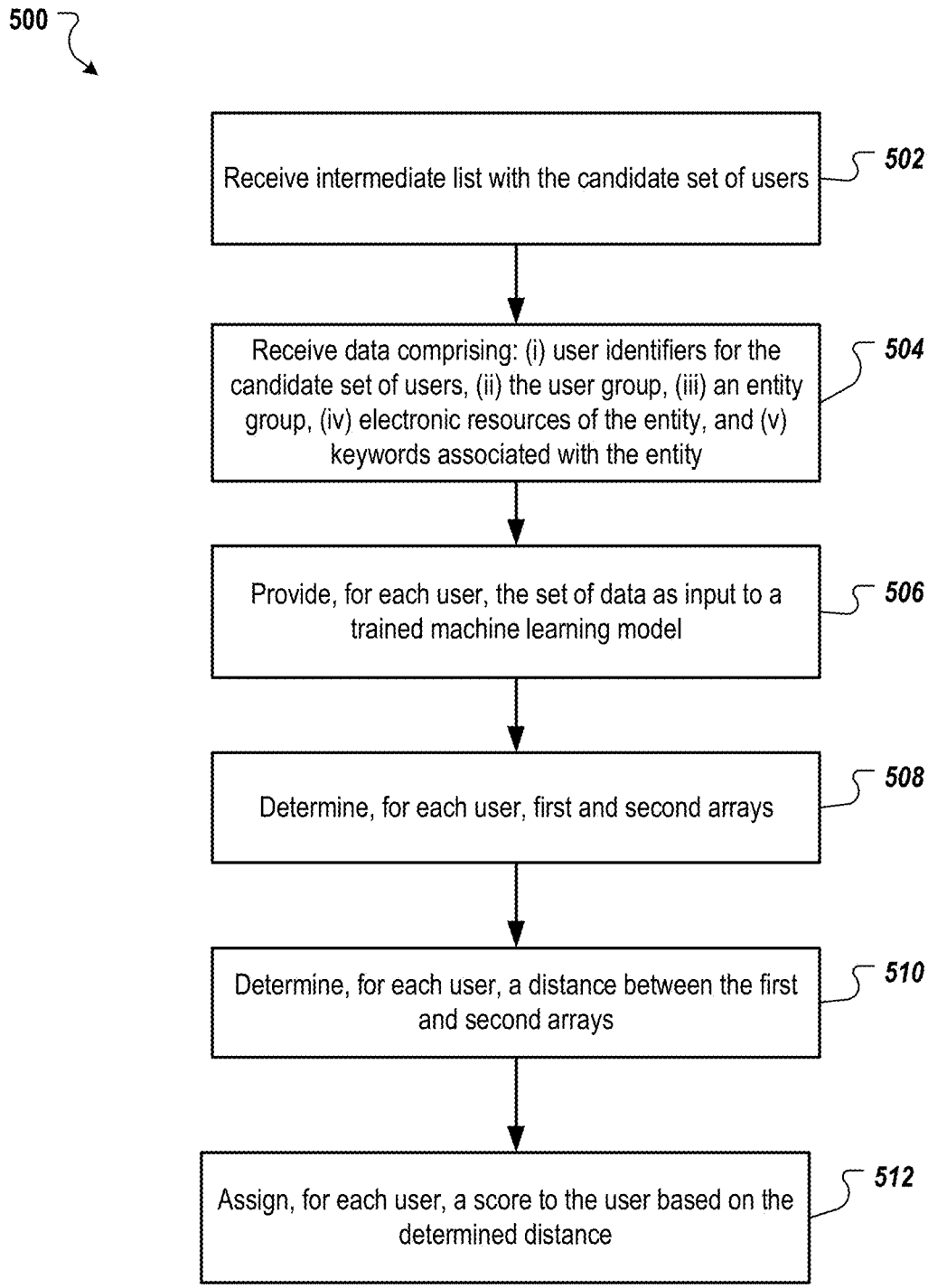
FIG. 5 is a flow diagram that illustrates an example process for determining scores for users that can be used to add the users to the user list.

In some implementations, selecting the subset of users can also include predicting or determining likelihoods that each of the users in the intermediate list would perform some action in response to receiving a digital component. Performing some action can include clicking on the digital component, purchasing or otherwise viewing products or other content of the digital component provider, searching for content of the digital component provider, etc. In other words, selecting the subset of users can be based on predicting the likelihood that each user would perform a specified action in response to viewing the digital component. For example, a proper subset of the intermediate list can be selected based on the likelihood that each user would click on the digital component, where that likelihood is a numeric value that exceeds a threshold value. If the user's likelihood of performing the specified action exceeds the threshold value, then the user can be identified as part of the proper subset of the intermediate list for inclusion in the user list. By including this user in the user list, the user can receive the digital components of the provider. If, on the other hand, there is a slight chance that the user would perform the specified action (e.g., the likelihood of performing the specified action is less than the threshold value), then the user may not be identified as part of the proper subset of the intermediate list. Refer to FIG. 5 for further discussion on selecting the proper subset of the intermediate list based on likelihood that each user in the intermediate list would perform the specified action in response to viewing the digital component.

In some implementations, one or more of the signals described above can be used to determine which users from the intermediate list should be added to the user list (e.g., the user action group) to receive the relevant digital components. A combination of one or more of these factors can also be used by the user list generation server to determine which users should receive the digital components relevant to actions that are associated with the user list. In some implementations, only one or fewer than all of these signals can be used to select the proper subset of the intermediate list to include in the user list and to receive the relevant digital components.

As an illustrative example, the user list generation server can filter the users in the candidate list based on their geographic identifiers then rank the filtered users based on their levels of online activity. The user list generation server can further rank the filtered and ranked users based on their user embeddings and/or likelihood that the users will perform some specified actions in response to viewing the digital components. By using a combination of the signals described above, the user list generation server can determine a more refined selection of users to receive one or more digital components without using or relying on any private or personal information of the users. The users can receive relevant digital components while preserving their privacy.

In some implementations, and as another example, the user list generation server can also generate an overall score for each user in the intermediate list. The overall score can be some combination of one or more of the signals described above. Each user can receive a score for each of the signals that are used to generate the overall score. The scores can then be weighted in order to determine the overall score for the user. Users with overall scores that satisfy a threshold condition can be selected as part of the proper subset for inclusion in the user list. Moreover, in some implementations, the user list generation server can rank the users in the intermediate list based on the overall scores. Users that are ranked within and/or above a predetermined threshold ranking condition can be identified as part of the proper subset for inclusion in the user list.

The user list generation server can then add the selected users to the user list in 410. The user list in 410 can be the final user list 138 (e.g., the user action group) described in reference to FIG. 1. The user list can now include one or more users from the original list, one or more of the additional users in the same group as at least one of the users from the original list (e.g., users that are part of the same user interest group as at least one of the users from the original list), and the proper subset of users from the intermediate list that were selected based on one or more signals described above. The user list, therefore, has been expanded to include more users who share common interests and perform similar actions. Not only has the user list been expanded, but it has also been refined and/or post-processed to more accurately identify users who share common interests and who should receive similar or same digital components. Using the techniques described herein, the user list can identify users without relying on the users' private or personal information. A larger and homogenous user list can further preserve the privacy of each user in the user list.

Example Processes for Determining User Scores for Adding the Users to User Lists FIG. 5 is a flow diagram that illustrates an example process 500 for determining scores for users that can be used to add the users to the user list (e.g., the user action group). In other words, the process 500 can be used as part of a post-processing technique in order to select and refine the user list that has been expanded to include one or more users from the original user list (e.g., user interest groups) and users that have similar interests as at least one of the users from the original list. By determining scores for the users, the user list generation server can determine likelihood that the users may perform a specified action in response to viewing the digital component. The process 500 can therefore be used in order to post-process, rank, and/or select users that can be added to the user list to receive digital components that correspond to interests of the user list. The process 500 can, for example, be performed as part of selecting the proper subset of users from the intermediate list in 408 in the process 400 (e.g., refer to FIG. 4). As a result, users that may not be as similar or that may not be as likely to perform some specified actions of the user list (e.g., the user action group) may be filtered out from the user list. Only users having similar interests or that are likely to perform the specified actions of the user list can therefore receive digital components that are relevant to the user list.

Operations of the process 500 can be implemented, for example, by the user list generation server 130. One or more of the operations of the process 500 can also be performed by the user grouping engine 114 and/or the content platforms 150. Operations of the process 500 can also be implemented as instructions stored on one or more computer readable media which may be non-transitory, and execution of the instructions by one or more data processing apparatus can cause the one or more data processing apparatus to perform the operations of the process 500.

Referring to the process 500, the user list generation server receives the intermediate list with the candidate set of users in 502. The intermediate list can be the list that is generated in 406 in the process 400 (e.g., refer to FIG. 4). The user list generation server can then perform the process 500 as part of selecting the proper subset of the users from the intermediate list for inclusion in the user list (e.g., refer to 408 in the process 400 in FIG. 4).

In 504, the user list generation server receives data that can include (i) user identifiers for the candidate set of users, (ii) the user interest group, (iii) an entity group (e.g., digital component provider group), (iv) electronic resources (e.g., websites, web pages, applications, etc.) of the entity, and (v) keywords associated with the entity. The user identifiers can be used by the web browser, applications, content platforms, etc. to uniquely identify each of the users. The user identifiers, as described herein, may not include personal or private information of the users. The user interest groups can be assigned to the users, as described in relation to the process 200, based at least in part on what electronic resources the users visit and/or actions taken by the users on such electronic resources. The user interest group can associate users within the group as having similar interests. The user interest group can be represented by an identifier that corresponds to that user interest group. As described throughout this disclosure, the identifiers can be alphanumeric values and/or other types of values. Data such as the user interest groups can be advantageous to enhance or otherwise improve assignment of scores to the users in the process 500. The entity group can be a unique identifier used to identify the provider of one or more digital components. The electronic resources can include electronic resources that are visited and/or accessed by the users or otherwise related to the entity. The keywords can include words, phrases, and/or values that can be used by the users to identify or search for the entity. One or more additional data can be received by the user list generation server. For example, the user list generation server can also receive user embeddings and/or user landing page features, as described above (e.g., refer to FIGS. 3-4). The received data can be advantageous to generate a more wholesome and accurate score indicating whether each user in the intermediate list is likely to perform some specified action that corresponds a digital component of the entity represented by the entity group in the data.

Accordingly, the user list generation server provides, for each user, the set of data as input to a trained machine learning model in 506. The trained machine learning model can be a deep neural network (DNN). The trained machine learning model can have multiple layers. One or more other types of machine learning models can also be used in the process 500. The model can be trained to associate/correlate the data that is provided as input to expected likelihoods that the user may perform some specified action. In other words, the model can be trained to correlate certain actions, signals, other data inputs, or combinations thereof with likelihood that the user may perform one or more specified actions. A score can then be assigned based on the correlation(s) made by the model.

The user list generation server determines, for each user, first and second arrays in 508. The first and second arrays can be determined by the user list generation server and based on applying the machine learning model and the set of data. The first and second arrays can be made up of multiple floating values (e.g., 256). In some implementations, the first and/or second arrays can be multidimensional. The first array can correspond to a user embedding or other user features (e.g., level of online activity, geographic location, one or more other signals) associated with the user. The second array can correspond to an entity embedding or other entity features (e.g., geographic location, one or more other signals) associated with the entity.

Next, the user list generation server determines, for each user, a distance between the first and second arrays (510). The distance can be determined based on applying the machine learning model described above. Statistical analysis techniques can be used to determine the distance. In some implementations, the distance can be determined based on averaging one or more values for each of the first and second arrays and comparing the averaged values for the first and second arrays. One or more other statistical analysis techniques are possible.

Based on the determined distance, the user list generation server assigns, for each user, a score to the user (512). The user list generation server can assign the score based on applying the machine learning model. In some implementations, the score can be the distance between the first and second arrays. In some implementations, the determined distance can be weighted. The weighted distance value can then be assigned as the score to the user. In yet some implementations, the determined distance can be correlated to a score value on a scale or range of values. The assigned score can indicate a likelihood that the user may perform some specified action in relation to a digital component of the entity whose entity group is provided as one of the data inputs to the machine learning model. The assigned score can be a numeric, boolean, and/or string value. The score can, for example, be a value between 0 and 1, −1 and 1, 1 and 10, 1 and 100, etc.

In some implementations, a higher score value can indicate a higher or greater likelihood that the user will perform the specified action in response to receiving a digital component of the entity whose entity group is provided as one of the data inputs. Likewise, a lower score value can indicate a lower or less likelihood that the user will perform the specified action. As an illustrative example, on a scale of 0 to 1, a value of 1 can indicate a high likelihood that the user will perform the specified action while a value of 0 can indicate a low likelihood that the user will perform the specified action. A higher score can be assigned based on the distance between the first and second arrays being smaller and/or less than some predetermined threshold level. A lower score can be assigned based on the distance between the first and second arrays being greater than some predetermined threshold level. Accordingly, the greater the distance between the first and second arrays, the less likely the user may perform the specified action that corresponds to the entity whose entity group is provided as one of the data inputs. This is because the user's embeddings and other user features may be too dissimilar from the embeddings and other features of the entity (e.g., digital component provider). Since the user's features are too dissimilar from those of the entity, the user may not be added to the user list and subsequently may not receive digital components from the entity.

The score that is assigned to the user in 512 can then be used by the user list generation server to select users to be included in the proper subset of users from the intermediate list (e.g., refer to 408 in the process 400 in FIG. 4). For example, if the user's score exceeds or otherwise satisfies a threshold score condition, then the user can be identified as part of the proper subset of the intermediate list for inclusion in the user list (e.g., the user action group). In other words, users that are more likely to perform some specified action in response to viewing the digital components of the entity whose entity group is provided as data input can be identified in the proper subset and added to the user list (e.g., the user action group) so that those users can receive the digital components of the entity.

In some implementations, as described throughout this document, the intermediate list of users can also be ranked based on their assigned scores. The user list generation server can then select one or more users based on their rakings in the intermediate list to be included in the final user list (e.g., the user action group).

In some implementations, instead of selecting users to be included in the proper subset of users from the intermediate list to then be added to the final user list, the user list generation server can remove users from the intermediate list based on their assigned scores. Thus, the user list generation server can filter out users who have features that are too dissimilar from the features of the entity whose entity group is provided as data input. Once those users are filtered out, the intermediate list can become the final user list, thereby containing only users who have features most similar to the features of the entity and who should receive relevant digital components of the entity.

Figure 6:
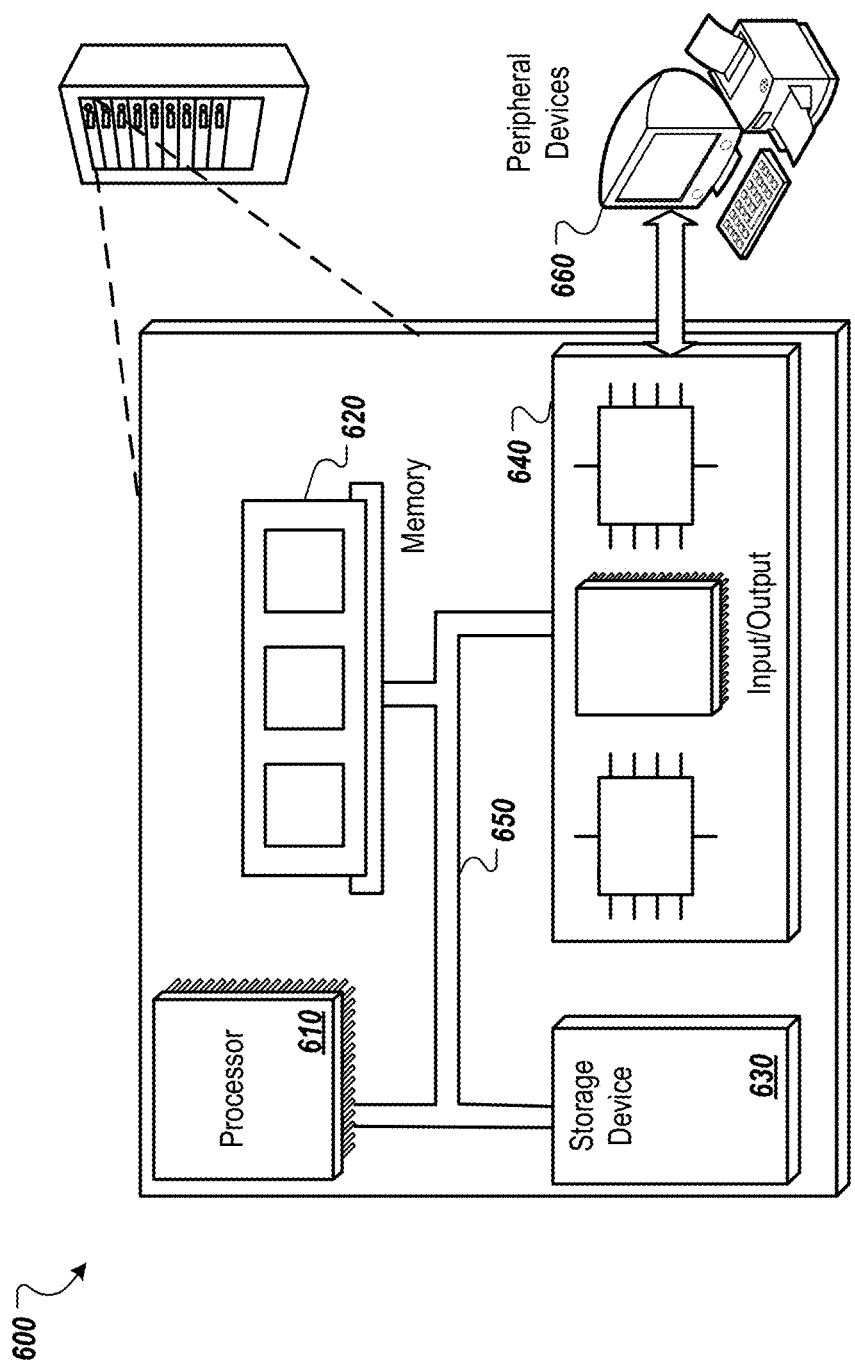
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
    obtaining a first user list comprising first user identifiers for first users that performed one or more specified actions with respect to an electronic resource of an entity;
    identifying, for each first user identifier of one or more of the first user identifiers, one or more user interest groups that include the first user identifier as a member;
    identifying a plurality of second users that are members of the one or more user interest groups identified for each of the one or more first user identifiers;
    generating an expanded user list that includes second user identifiers for at least a portion of the second users and the first user identifiers of the first user list; and
    distributing digital components to the first and second users based on the expanded user list.

2. The method of claim 1, wherein generating the expanded user list comprises:
    identifying, for each second user, a geographic identifier that indicates a geographic location of the second user; and
    selecting, for inclusion in the expanded user list, each second user for which the geographic identifier satisfies a location condition for the expanded user list.

3. The method of claim 1, wherein generating the expanded user list comprises:
    identifying, for each second user, a level of online activity of the second user;
    ranking the second users based on the level of online activity of each second user; and
    selecting, for inclusion in the expanded user list, a proper subset of the second users based on the ranking.

4. The method of claim 1, wherein generating the expanded user list comprises:
    identifying, for each second user, user embeddings that indicate user preferences of the second user;
    ranking the second users based on the user embeddings for each second user; and
    selecting, for inclusion in the expanded user list, a proper subset of the second users based on the ranking.

5. The method of claim 1, wherein generating the expanded user list comprises:
    generating, for each second user, a score based on a set of data for the second user, the set of data for each second user comprising one or more of: (i) the second user identifier for the second user, (ii) one or more user interest groups, (iii) an entity group of the entity, (iv) electronic resources of the entity, and (v) keywords associated with the entity; and
    selecting, for inclusion in the expanded user list, each user having a score that satisfies a threshold score condition for the expanded user list.

6. The method of claim 5, wherein generating the score for each second user comprises:
    providing the set of data for the second user as input to a machine learning model; and
    receiving the score as an output of the machine learning model.

7. The method of claim 1, wherein distributing digital components to the first and second users based on the expanded user list comprises providing one or more digital components of the entity to each user having a user identifier in the expanded user list.

8. The method of claim 1, wherein distributing digital components to the first and second users based on the expanded user list comprises:
   receiving a digital component request from a client device of a given user;
   determining that an identifier for the given user is included in the expanded user list; and
   providing a digital component of the entity to the client device of the given user in response to determining that the identifier for the given user is included in the expanded user list.

9. A system comprising:
   one or more processors; and
   one or more storage devices storing instructions that, when executed by the one or more processors, cause the one or more processors to perform operations comprising:
      obtaining a first user list comprising first user identifiers for first users that performed one or more specified actions with respect to an electronic resource of an entity;
      identifying, for each first user identifier of one or more of the first user identifiers, one or more user interest groups that include the first user identifier as a member;
      identifying a plurality of second users that are members of the one or more user interest groups identified for each of the one or more first user identifiers;
      generating an expanded user list that includes second user identifiers for at least a portion of the second users and the first user identifiers of the first user list; and
      distributing digital components to the first and second users based on the expanded user list.

10. The system of claim 9, wherein generating the expanded user list comprises:
   identifying, for each second user, a geographic identifier that indicates a geographic location of the second user; and
   selecting, for inclusion in the expanded user list, each second user for which the geographic identifier satisfies a location condition for the expanded user list.

11. The system of claim 9, wherein generating the expanded user list comprises:
   identifying, for each second user, a level of online activity of the second user;
   ranking the second users based on the level of online activity of each second user; and
   selecting, for inclusion in the expanded user list, a proper subset of the second users based on the ranking.

12. The system of claim 9, wherein generating the expanded user list comprises:
   identifying, for each second user, user embeddings that indicate user preferences of the second user;
   ranking the second users based on the user embeddings for each second user; and
   selecting, for inclusion in the expanded user list, a proper subset of the second users based on the ranking.

13. The system of claim 9, wherein generating the expanded user list comprises:
   generating, for each second user, a score based on a set of data for the second user, the set of data for each second user comprising one or more of: (i) the second user identifier for the second user, (ii) one or more user interest groups, (iii) an entity group of the entity, (iv) electronic resources of the entity, and (v) keywords associated with the entity; and
   selecting, for inclusion in the expanded user list, each user having a score that satisfies a threshold score condition for the expanded user list.

14. The system of claim 13, wherein generating the score for each second user comprises:
   providing the set of data for the second user as input to a machine learning model; and
   receiving the score as an output of the machine learning model.

15. The system of claim 9, wherein distributing digital components to the first and second users based on the expanded user list comprises providing one or more digital components of the entity to each user having a user identifier in the expanded user list.

16. The system of claim 9, wherein distributing digital components to the first and second users based on the expanded user list comprises:
   receiving a digital component request from a client device of a given user;
   determining that an identifier for the given user is included in the expanded user list; and
   providing a digital component of the entity to the client device of the given user in response to determining that the identifier for the given user is included in the expanded user list.

17. A non-transitory computer readable storage medium carrying instructions that, when executed by one or more processors, cause the one or more processors to perform operations comprising:
   obtaining a first user list comprising first user identifiers for first users that performed one or more specified actions with respect to an electronic resource of an entity;
   identifying, for each first user identifier of one or more of the first user identifiers, one or more user interest groups that include the first user identifier as a member;
   identifying a plurality of second users that are members of the one or more user interest groups identified for each of the one or more first user identifiers;
   generating an expanded user list that includes second user identifiers for at least a portion of the second users and the first user identifiers of the first user list; and
   distributing digital components to the first and second users based on the expanded user list.

18. The non-transitory computer readable storage medium of claim 17, wherein generating the expanded user list comprises:
   identifying, for each second user, a geographic identifier that indicates a geographic location of the second user; and
   selecting, for inclusion in the expanded user list, each second user for which the geographic identifier satisfies a location condition for the expanded user list.

19. The non-transitory computer readable storage medium of claim 17, wherein generating the expanded user list comprises:
   identifying, for each second user, a level of online activity of the second user;
   ranking the second users based on the level of online activity of each second user; and
   selecting, for inclusion in the expanded user list, a proper subset of the second users based on the ranking.

20. The non-transitory computer readable storage medium of claim 17, wherein generating the expanded user list comprises:
- identifying, for each second user, user embeddings that indicate user preferences of the second user;
- ranking the second users based on the user embeddings for each second user; and
- selecting, for inclusion in the expanded user list, a proper subset of the second users based on the ranking.

* * * * *